United States Patent [19]
Yard

[11] Patent Number: 5,892,934
[45] Date of Patent: *Apr. 6, 1999

[54] MICROPROCESSOR CONFIGURED TO DETECT A BRANCH TO A DSP ROUTINE AND TO DIRECT A DSP TO EXECUTE SAID ROUTINE

[75] Inventor: Christopher J. Yard, Austin, Tex.

[73] Assignee: Advanced Micro Devices, Inc.

[ * ] Notice: The term of this patent shall not extend beyond the expiration date of Pat. No. 5,721,945.

[21] Appl. No.: 626,472

[22] Filed: Apr. 2, 1996

[51] Int. Cl.⁶ .................................................. G06F 9/44
[52] U.S. Cl. ..................... 395/379; 395/580; 395/800.35
[58] Field of Search ................................... 395/379, 800, 395/586, 580, 290, 589, 800.34, 800.35, 200.38, 200.43

[56] References Cited

U.S. PATENT DOCUMENTS

| | | | |
|---|---|---|---|
| 4,715,013 | 12/1987 | MacGregor et al. | 395/379 |
| 4,803,619 | 2/1989 | Bernstein et al. . | |
| 4,825,360 | 4/1989 | Knight, Jr. | 395/676 |
| 4,926,318 | 5/1990 | Nakayama | 395/287 |
| 4,942,519 | 7/1990 | Nakayama | 395/290 |
| 4,954,945 | 9/1990 | Inoue | 395/675 |
| 4,979,102 | 12/1990 | Tokuume | 395/200.43 |
| 5,134,713 | 7/1992 | Miller et al. | 395/800.34 |
| 5,278,825 | 1/1994 | Blomgren et al. | 395/586 |
| 5,355,485 | 10/1994 | Denio et al. . | |
| 5,495,588 | 2/1996 | Gilbert et al. | 395/379 |
| 5,590,363 | 12/1996 | Lunsford et al. | 395/800.34 |
| 5,598,575 | 1/1997 | Dent et al. | 395/800 |
| 5,625,828 | 4/1997 | Carmon et al. | 395/800 |
| 5,721,945 | 2/1998 | Mills et al. | 395/800.35 |

FOREIGN PATENT DOCUMENTS

| | | |
|---|---|---|
| 0 442 041 A2 | 8/1991 | European Pat. Off. . |
| 0 671 685 A2 | 9/1995 | European Pat. Off. . |
| 94/27215 | 11/1994 | WIPO . |

OTHER PUBLICATIONS

Bramley, R. et al., "Vectram–a–transputer–based vector/signal–processing module," Computing & Control Engineering Journal, Sep. 1990, UK, vol. 1, No. 5, ISSN 0956–3385, pp. 214–218.

International Search Report PCT/US 96/19593 dated Apr. 28, 1997.

*Primary Examiner*—Thomas C. Lee
*Assistant Examiner*—Gautam R. Patel
*Attorney, Agent, or Firm*—Conley, Rose & Tayon, PC; B. Noel Kivlin

[57] ABSTRACT

A microprocessor configured to detect subroutine call instructions having a target address indicative of a DSP function is provided. The detection of such instructions may be performed, for example, in an instruction decode unit within the microprocessor. Subroutine call instructions detected in this manner are routed to a digital signal processor coupled near the microprocessor or possibly integrated into the microprocessor. The microprocessor may be configured to store an indication that the DSP is enabled. If the DSP is not enabled, then the microprocessor executes the original routines stored at the target address of the instruction. Although the routines may not be as efficient in performing the DSP function, the program employing the function may still operate properly in the absence of the DSP. In this manner, a computer system may initially operate without the DSP included. If a user later decides to upgrade the computer system with a DSP, then the microprocessor may dispatch DSP functions to the DSP. Until the upgrade occurs, the microprocessor may execute the functions.

17 Claims, 7 Drawing Sheets

MICROPROCESSOR CONFIGURED TO DETECT A BRANCH TO A DSP ROUTINE AND TO DIRECT A DSP TO EXECUTE SAID ROUTINE

BACKGROUND OF THE INVENTION

1. Field of the Invention

This invention is related to the field of computer systems and microprocessors and, more particularly, to efficient hardware for executing DSP functions within such computer systems and microprocessors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. An exemplary DSP is the ADSP 2171 available from Analog Devices, Inc. of Norwood, Mass.

Unfortunately, many instruction sequences (or "routines") which perform complex mathematical operations are coded in the x86 instruction set. Such mathematical routines often may be more efficiently performed by a DSP. Microprocessors often execute instructions from the x86 instruction set, due to its widespread acceptance in the computer industry. Conversely, DSPs develop instruction sets which are optimized for mathematical operations common to signal processing. Because the DSP instruction set is optimized for performing mathematical routines, it is desirable to determine that a routine may be more efficiently executed in a DSP and to route such a routine to a DSP for execution. It is further desirable to perform such a detection in a manner that allows for the original x86 routine to be executed if a DSP is not included in the computer system.

SUMMARY OF THE INVENTION

The problems outlined above are in large part solved by a microprocessor in accordance with the present invention. The microprocessor is configured to detect subroutine call instructions having a target address indicative of a DSP function. The detection of such instructions may be performed, for example, in an instruction decode unit within the microprocessor. Subroutine call instructions detected in this manner are routed to a digital signal processor coupled near the microprocessor or possibly integrated into the microprocessor. Advantageously, routines which may be more efficiently execute by a DSP may be routed thereto. Performance of the computer system may be increased in response to the more efficient execution of the DSP routines.

The microprocessor may be configured to store an indication that the DSP is enabled. If the DSP is not enabled, then the microprocessor executes the original routines stored at the target address of the instruction. Although the routines may not be as efficient in performing the DSP function, the program employing the function may still operate properly in the absence of the DSP. In this manner, a computer system may initially operate without the DSP included. If a user later decides to upgrade the computer system with a DSP, then the microprocessor may dispatch DSP functions to the DSP. Until the upgrade occurs, the microprocessor may execute the functions. Advantageously, programs which utilize DSP functions may operate properly with or without the DSP being included.

Broadly speaking, the present invention contemplates a microprocessor comprising an instruction cache and an instruction decode unit. The instruction cache is configured to store instructions. The instruction decode unit is coupled to receive instructions from the instruction cache, and is configured to detect a subroutine call instruction having a target address indicative of a digital signal processing function. Upon detection of such a subroutine call instruction, the instruction decode unit is configured to route an indication of the target address to a digital signal processor.

The present invention further contemplates a computer system comprising a microprocessor and a digital signal processor. The microprocessor is configured to execute instructions including a subroutine call instruction indicative of a digital signal processing function. Coupled to receive an indication of the digital signal processing function from the microprocessor, the digital signal processor is configured to perform the digital signal processing function according to the indication.

BRIEF DESCRIPTION OF THE DRAWINGS

Other objects and advantages of the invention will become apparent upon reading the following detailed description and upon reference to the accompanying drawings in which.

Figure 1:
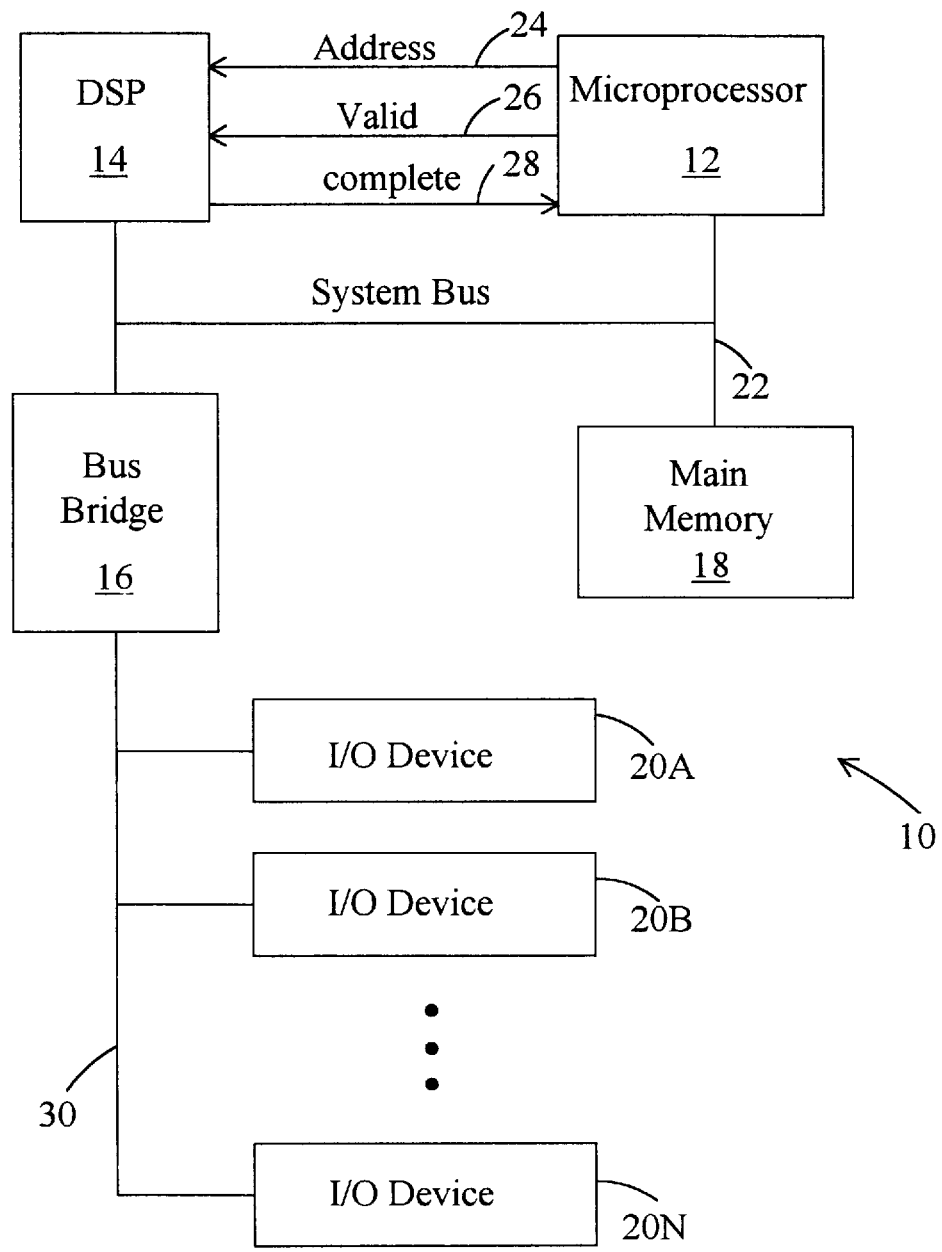
FIG. 1 is a block diagram of a computer system including a microprocessor and a digital signal processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a microprocessor 12, a DSP 14, a bus bridge 16, a main memory 18, and a plurality of input/output (I/O) devices 20A–20N (collectively referred to as I/O devices 20). A system bus 22 couples microprocessor 12, DSP 14, bus bridge 16, and main memory 18. Additionally, microprocessor 12 and DSP 14 are coupled together via an address bus 24, a valid conductor 26, and a complete conductor 28. I/O devices 20A–20N are coupled to bus bridge 16 via an I/O bus 30.

Generally speaking, microprocessor 12 includes circuitry for detecting a subroutine call instruction having a target address which is indicative of a DSP function (i.e. instructions residing at the target address perform a complex mathematical operation which may be more efficiently executed upon a DSP). When a subroutine call instruction having a target address indicative of a DSP function is detected, microprocessor 12 transmits the target address to DSP 14 upon address bus 24. Additionally, a signal upon valid conductor 26 is asserted to indicate that an address is being conveyed. DSP 14 receives the address, and executes a routine stored therein corresponding to the x86 instructions residing at the target address. Subsequent to the completion of the routine, DSP 14 asserts a signal upon complete conductor 28. Microprocessor 12 may then continue instruction execution with the instruction subsequent to the subroutine call instruction. Advantageously, DSP functions are performed within DSP 14 instead of microprocessor 12. Performance of the computer system may be increased by the more efficient execution of the DSP function.

As used herein, the term "DSP function" refers to a function which DSPs are optimized to perform, but that microprocessors are not typically optimized to perform. DSP functions may include complex mathematical functions such as correlations, convolutions, finite impulse response (FIR) filters, infinite impulse response (IIR) filters, Fast Fourier Transforms (FFTs), matrix computations, and inner products. Additional mathematical functions may be performed by DSP 14 as well. These mathematical functions have in common a repetitive multiply and accumulate function in which a pair of operands are multiplied and the product is added to a third operand, which is often the accumulation of prior multiplications.

As noted above, subroutine call instructions having a target address indicative of a DSP function are detected by microprocessor 12 for routing to DSP 14. Subroutine call instructions are used to switch instruction dispatch and execution to a code sequence residing in memory at a target address supplied by the subroutine call instruction. Additionally, subroutine call instructions store the address of the instruction subsequent to the subroutine call instruction. At the conclusion of the subroutine code sequence, a corresponding subroutine return instruction may be executed. The subroutine return instruction uses the sequential address stored by the most recently executed call instruction as a target address. In this manner, subroutines may be performed by the microprocessor. The same subroutine may be executed from different locations within a code sequence, and the subroutine call and subroutine return instructions cause correct transition from the point at which the subroutine call instruction is executed to the subroutine and from the subroutine to the instruction subsequent to the subroutine call instruction. An exemplary subroutine call instruction is the CALL instruction of the x86 microprocessor architecture. The CALL instruction pushes the sequential address onto a stack data structure defined by the x86 microprocessor architecture, and branches to the target address. In one embodiment, microprocessor 12 detects subroutine call instructions having a target address indicative of a DSP function and dispatches the target address to DSP 14.

In addition to subroutine call instructions, microprocessor 12 executes other instructions and operates upon data. The data and instructions are typically stored in main memory 18. Microprocessor 12 is configured to communicate with I/O devices 20 through bus bridge 16.

In one embodiment, DSP 14 includes a digital signal processing core similar to the ADSP-2171 from Analog Devices, Inc. Additionally, DSP 14 includes circuitry for receiving the address upon address bus 24 when the valid signal upon valid conductor 26 is asserted. The address is used as an index into a program memory within DSP 14, and a routine stored therein is executed. At the conclusion of the routine, DSP 14 asserts a signal upon complete conductor 28 to indicate completion. DSP 14 may perform bus transactions upon system bus 22 to retrieve data to be operated upon from main memory 18, in one embodiment. In another embodiment, DSP 14 is coupled to a separate memory (not shown) from which it retrieves operands. In yet another embodiment, DSP 14 is included within an I/O device 20 upon I/O bus 30. It is noted that routines may be stored into the program memory of DSP 14 when computer system 10 is powered on, or the routines may be permanently stored into a read-only memory (ROM) forming the program memory.

Bus bridge 16 is provided to assist in communications between I/O devices 20 and devices coupled to system bus 22. I/O devices 20 typically require longer bus clock cycles than microprocessor 12 and other devices coupled to system bus 22. Therefore, bus bridge 16 provides a buffer between system bus 22 and input/output bus 30. Additionally, bus bridge 16 translates transactions from one bus protocol to another. In one embodiment, input/output bus 30 is an Enhanced Industry Standard Architecture (EISA) bus and bus bridge 16 translates from the system bus protocol to the EISA bus protocol. In another embodiment, input/output bus 30 is a Peripheral Component Interconnect (PCI) bus and bus bridge 16 translates from the system bus protocol to the PCI bus protocol. It is noted that many variations of system bus protocols exist. Microprocessor 12 may employ any suitable system bus protocol.

I/O devices 20 provide an interface between computer system 10 and other devices external to the computer system. Exemplary I/O devices include a modem, a serial or parallel port, a sound card, etc. I/O devices 20 may also be referred to as peripheral devices. Main memory 18 stores data and instructions for use by microprocessor 12. In one embodiment, main memory 20 includes at least one Dynamic Random Access Memory (DRAM) cell and a DRAM memory controller.

It is noted that although computer system 10 as shown in FIG. 1 includes one microprocessor, other embodiments of computer system 10 may included multiple microprocessors similar to microprocessor 12. It is further noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
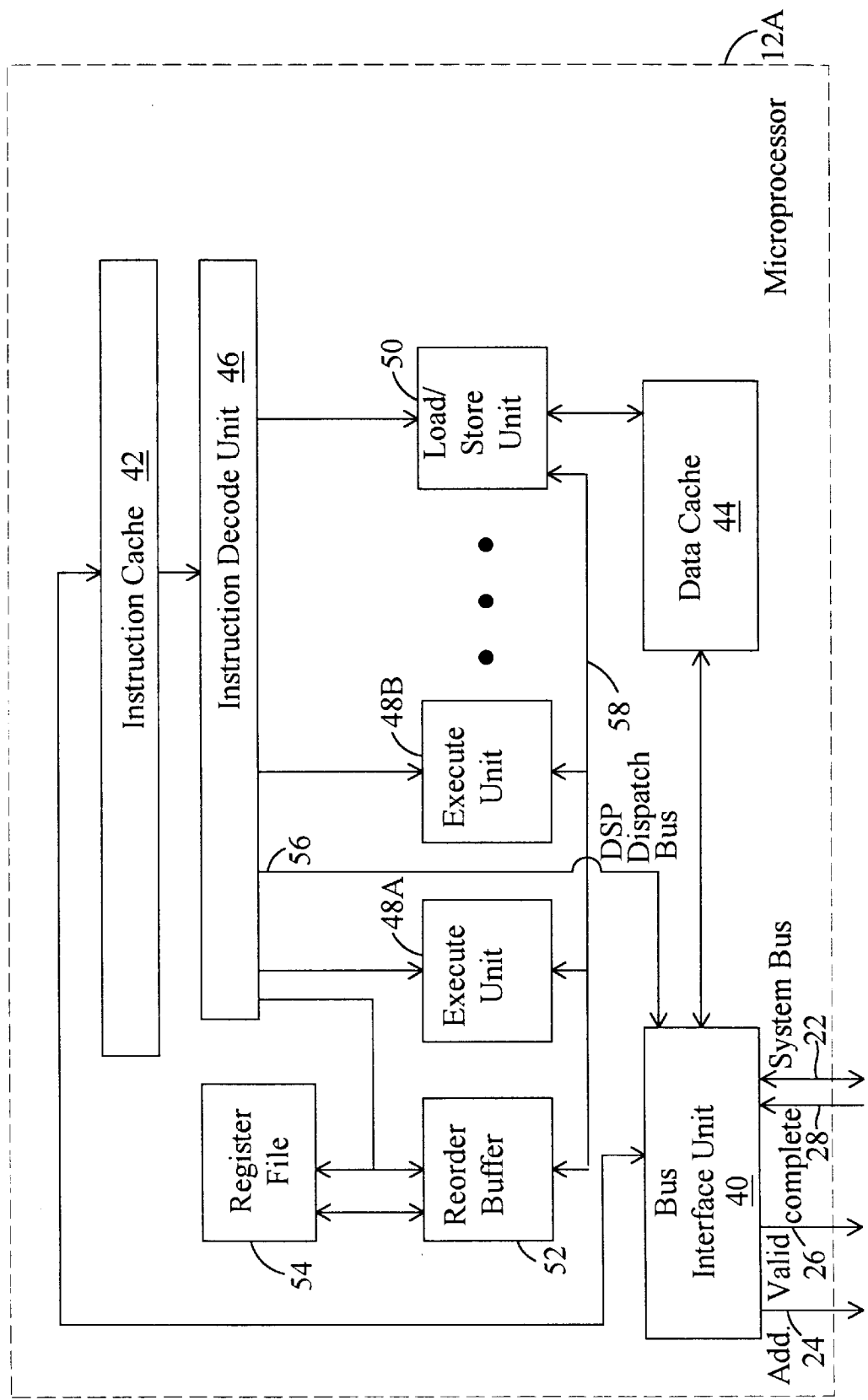
FIG. 2 is a block diagram of one embodiment of the microprocessor shown in FIG. 1, including an instruction decode unit.

Turning now to FIG. 2, one embodiment of microprocessor 12 (microprocessor 12A) is shown. Microprocessor 12A includes a bus interface unit 40, an instruction cache 42, a data cache 44, an instruction decode unit 46, a plurality of execute units including execute units 48A and 48B, a load/store unit 50, a reorder buffer 52, and a register file 54. The plurality of execute units will be collectively referred to herein as execute units 48, and may include more execute units than execute units 48A and 48B shown in FIG. 2. Additionally, an embodiment of microprocessor 12A may include one execute unit 48. Bus interface unit 40 is coupled to a DSP dispatch bus 56, which is further coupled to instruction decode unit 46. Additionally, bus interface unit 40 is coupled to instruction cache 42 and data cache 44. Address bus 24, valid conductor 26, complete conductor 28, and system bus 22 are coupled to bus interface unit 40. Instruction cache 42 is coupled to instruction decode unit 46, which is further coupled to execute units 48, reorder buffer 52, and load/store unit 50. Reorder buffer 52, execute units 48, and load/store unit 50 are each coupled to a result bus 58 for forwarding of execution results. Load/store unit 50 is coupled to data cache 44.

Generally speaking, instruction decode unit 46 is configured to detect subroutine call instructions having a target address indicative of a DSP function. The target addresses are compared to a set of previously defined addresses to determine whether or not the target addresses are indicative of a DSP function. If such an instruction is detected, instruction decode unit 46 transmits the corresponding target address to bus interface unit 40 upon DSP dispatch bus 56. Upon receipt of a target address upon DSP dispatch bus 56, bus interface unit 40 transmits the target address upon address bus 24 and asserts a signal upon valid conductor 26. Microprocessor 12A then stalls subsequent instruction dispatch until a signal upon complete conductor 28 is asserted, indicating that the routine identified by the target address has been completed by DSP 14. Advantageously, the DSP function embodied within the identified routine may be executed more efficiently in the DSP than in microprocessor 12A. When the complete signal is received, instruction dispatch and execution continues at the instruction subsequent to the subroutine call instruction.

If DSP 14 is not included in a computer system, instruction decode unit 46 dispatches subroutine call instructions having a target address indicative of a DSP instruction to execute units 48. Execute units 48 execute the subroutine call instructions, causing instructions to be fetched from the target address. In this manner, the original x86 routines implementing the requested DSP function are executed. Although less efficient than the execution of a corresponding routine in DSP 14, the program executes correctly. Advantageously, the presence or absence of DSP 14 does not affect the correct operation of the program.

Instruction cache 42 is a high speed cache memory for storing instructions. It is noted that instruction cache 42 may be configured into a set-associative or direct mapped configuration. Instruction cache 42 may additionally include a branch prediction mechanism for predicting branch instructions as either taken or not taken. Instructions are fetched from instruction cache 42 and conveyed to instruction decode unit 46 for decode and dispatch to an execution unit.

As noted above, instruction decode unit 46 detects subroutine call instructions. In the embodiment shown, instruction decode unit 46 decodes each instruction fetched from instruction cache 42. Instruction decode unit 46 dispatches the instruction to execute units 48 and/or load/store unit 50. Instruction decode unit 46 also detects the register operands used by the instruction and requests these operands from reorder buffer 52 and register file 54. In one embodiment, execute units 48 are symmetrical execution units. Symmetrical execution units are each configured to execute a particular subset of the instruction set employed by microprocessor 12A. The subsets of the instruction set executed by each of the symmetrical execution units are the same. In another embodiment, execute units 48 are asymmetrical execution units configured to execute dissimilar instruction subsets. For example, execute units 48 may include a branch execute unit for executing branch instructions, one or more arithmetic/logic units for executing arithmetic and logical instructions, and one or more floating point units for executing floating point instructions. Instruction decode unit 46 dispatches an instruction to an execute unit 48 or load/store unit 50 which is configured to execute that instruction.

Load/store unit 50 provides an interface between execute units 48 and data cache 44. Load and store memory operations are performed by load/store unit 50 to data cache 44. Additionally, memory dependencies between load and store memory operations are detected and handled by load/store unit 50.

Execute units 48 and load/store unit 50 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 46, execute units 48, and load/store unit 50. Such an embodiment may perform the dispatch function within the centralized reservation station.

Microprocessor 12A supports out of order execution, and employs reorder buffer 52 for storing execution results of speculatively executed instructions and storing these results into register file 54 in program order, for performing dependency checking and register renaming, and for providing for mispredicted branch and exception recovery. When an instruction is decoded by instruction decode unit 46, requests for register operands are conveyed to reorder buffer 52 and register file 54. In response to the register operand requests, one of three values is transferred to the execute unit 48 and/or load/store unit 50 which receives the instruction: (1) the value stored in reorder buffer 52, if the value has been speculatively generated; (2) a tag identifying a location within reorder buffer 52 which will store the result, if the value has not been speculatively generated; or (3) the value stored in the register within register file 54, if no instructions within reorder buffer 52 modify the register. Additionally, a storage location within reorder buffer 52 is allocated for storing the results of the instruction being decoded by instruction decode unit 46. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 48 or load/store unit 50 execute an instruction, the tag assigned to the instruction by reorder buffer 52 is conveyed upon result bus 58 along with the result of the instruction. Reorder buffer 52 stores the result in the indicated storage location. Additionally, execute units 48 and load/store unit 50 compare the tags conveyed upon result bus 58 with tags of operands for instructions stored therein. If a match occurs, the unit captures the result from result bus 58 and stores it with the corresponding instruction. In this manner, an instruction may receive the operands it is intended to operate upon. Capturing results from result bus 58 for use by instructions is referred to as "result forwarding".

Instruction results are stored into register file 54 by reorder buffer 52 in program order. Storing the results of an instruction and deleting the instruction from reorder buffer 52 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 52 discards the instructions subsequent to the mispredicted branch instructions. Instructions thus discarded are also flushed from execute units 48, load/store unit 50, and instruction decode unit 46.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, now abandoned, filed Oct. 29, 1993 by Witt, et al. These documents are incorporated herein by reference in their entirety.

Register file 54 includes storage locations for each register defined by the microprocessor architecture employed by microprocessor 12A. For example, microprocessor 12A may employ the x86 microprocessor architecture. For such an embodiment, register file 54 includes locations for storing the EAX, EBX, ECX, EDX, ESI, EDI, ESP, and EBP register values.

Data cache 44 is a high speed cache memory configured to store data to be operated upon by microprocessor 12A. It is noted that data cache 44 may be configured into a set-associative or direct-mapped configuration.

Bus interface unit 40 is configured to effect communication between microprocessor 12A and devices coupled to system bus 22. For example, instruction fetches which miss instruction cache 42 may be transferred from main memory 18 by bus interface unit 40. Similarly, data requests performed by load/store unit 50 which miss data cache 44 may be transferred from main memory 18 by bus interface unit 40. Additionally, data cache 44 may discard a cache line of data which has been modified by microprocessor 12A. Bus interface unit 40 transfers the modified line to main memory 18.

It is noted that instruction decode unit 46 may be configured to dispatch an instruction to more than one execution unit. For example, in embodiments of microprocessor 12A which employ the x86 microprocessor architecture, certain instructions may operate upon memory operands. Executing such an instruction involves transferring the memory operand from data cache 44, executing the instruction, and transferring the result to memory (if the destination operand is a memory location). Load/store unit 50 performs the memory transfers, and an execute unit 48 performs the execution of the instruction.

Figure 3:
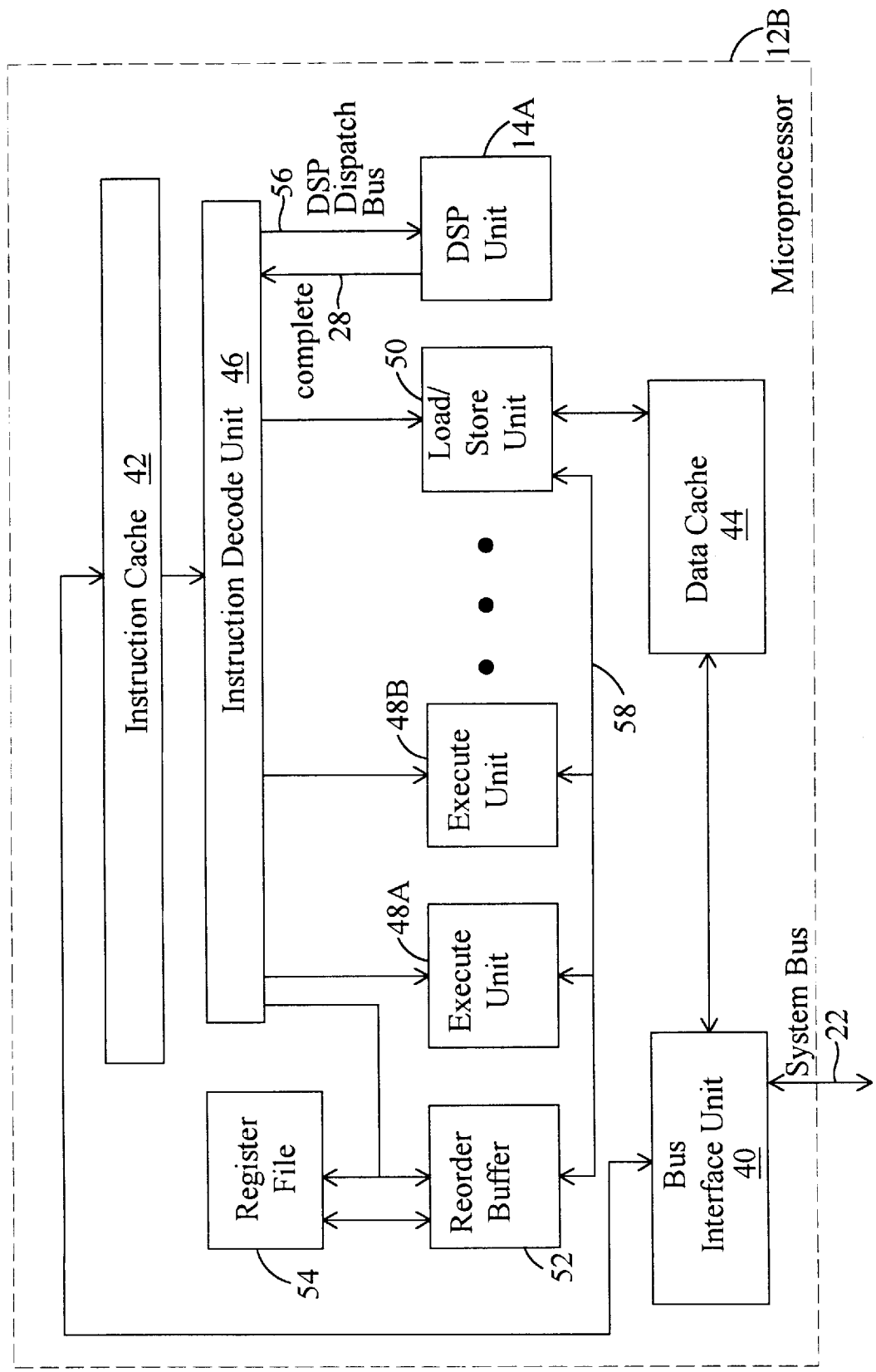
FIG. 3 is a block diagram of another embodiment of the microprocessor shown in FIG. 1, including an instruction decode unit and a DSP unit.

Turning now to FIG. 3, a second embodiment of microprocessor 12 (microprocessor 12B) is shown. Like numbered elements in FIGS. 2 and 3 are similar. In addition to the elements shown in FIG. 2, microprocessor 12B integrates DSP 14 (shown in FIG. 1) as a DSP unit 14A. Bus interface unit 40 includes circuitry for effecting communication upon system bus 22, but does not include busses and conductors for communicating with DSP 14 in this embodiment. Instead, DSP unit 14A and instruction decode unit 46 communicate directly. Advantageously, a computer system equipped with microprocessor 12B may eliminate the separate DSP shown in FIG. 1.

DSP unit 14A may be configured similar to DSP 14. However, DSP unit 14A accepts indications of the DSP function to perform upon DSP dispatch bus 56 from instruction decode unit 46. Once a requested DSP function is complete, DSP unit 14A asserts a signal upon complete conductor 28 to instruction decode unit 46. Additionally, DSP unit 14A may be configured to access data cache 44 for data operands. Data operands may be stored in a memory within DSP unit 14A for quicker access, or may be accessed directly from data cache 44 when needed.

The above discussion describes the target address being conveyed upon address bus 24. It is noted that a portion of the address sufficient for DSP 14 to identify the requested routine may be conveyed. For example, the instruction memory within DSP 14 may store instructions in a plurality of storage locations indexed by the target address. The portion of the address used as the index may be conveyed. Such embodiments are contemplated. Additionally, a value (or "tag") indicative of the requested function may be conveyed upon address bus 24 instead of the target address. The tag uniquely identifies the requested function within the set of functions employed by DSP 14 or 14A. Advantageously, the tag may include significantly fewer bits than the target addresses, reducing the number of parallel conductors in address bus 24. Instruction decode unit 46 may determine the tag based upon the target addresses. In this manner, target addresses may be freely selected to be any suitable address, as opposed to being constrained based upon the storage within DSP 14. Instruction decode unit 46 includes a mapping from each target address to a corresponding tag in such an embodiment.

Additional information regarding microprocessors may be found within the commonly assigned, co-pending patent application entitled "High Performance Superscalar Microprocessor", Ser. No. 08/146,382, now abandoned, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377843, now abandoned, filed Jan. 25, 1995 by Witt, et al. The disclosures of these patent applications are incorporated herein by reference in their entirety.

Figure 4:
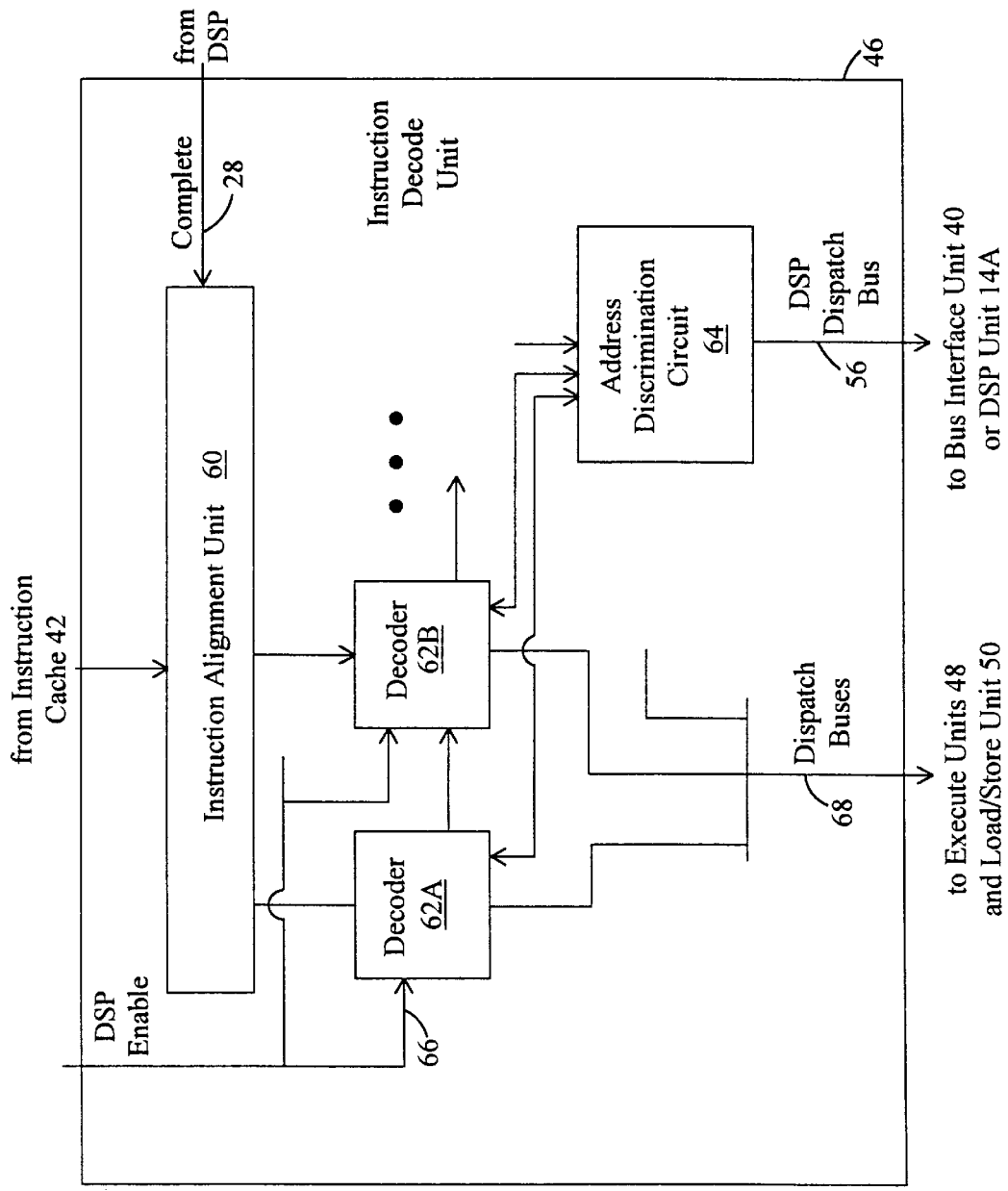
FIG. 4 is a diagram of one embodiment of the instruction decode unit shown in FIGS. 2 and 3, including an address discrimination circuit.

Turning now to FIG. 4, one embodiment of instruction decode unit 46 is shown. Instruction decode unit 46 includes an instruction alignment unit 60, a plurality of decoder circuits including decoder circuits 62A–62B (collectively referred to as decoder circuits 62), and an address discrimination circuit 64. More or fewer decoder circuits 62 may be included in various embodiments. Instruction alignment unit 60 is coupled to receive instructions fetched from instruction cache 42, and to align instructions to decoder circuits 62. Decoder circuits 62 receive a DSP enable signal upon a DSP enable conductor 66. Each decoder circuit 62 decodes the instruction received from instruction alignment unit 60 to determine the register operands manipulated by the instruction as well as the unit to receive the instruction. An indication of the unit to receive the instruction as well as the instruction itself are conveyed upon a plurality of dispatch buses 68 to execute units 48 and load/store unit 50. Other buses, not shown, are used to request register operands from reorder buffer 52 and register file 54.

Decoder circuits 62 decode subroutine call instructions. When a decoder circuit 62 detects a subroutine call instruction, the decoder circuit transmits the associated target address to address discrimination circuit 64. In one embodiment, the subroutine call instruction includes a displacement field which is added to the address of the subroutine call instruction to generate the target address. Address discrimination circuit 64 includes adders for such an embodiment in order to form the target address, and address discrimination circuit 64 receives both the displacement field and the address of the subroutine call instruction in order to form the target address. In another embodiment, decoder circuits 62 each include an adder circuit for forming the target address.

Address discrimination circuit 64 conveys the target address upon DSP dispatch bus 56 to bus interface unit 40 (in microprocessor 12A) or DSP unit 14A (in microprocessor 12B) if address discrimination circuit 64 determines that the target address is indicative of a DSP function. Additionally, address discrimination circuit 64 returns an indication of whether or not a given target address is indicative of a DSP function to decoder circuits 62. If a decoder circuit 62 detects a subroutine call instruction and the target address is found to be not indicative of a DSP function, then the decoder circuit 62 dispatches the subroutine call instruction to an execute unit 48.

Instructions subsequent to the subroutine call instruction which is dispatched upon DSP dispatch bus 56 are stalled until the complete signal upon complete conductor 28 (coupled to instruction alignment unit 60) is asserted. If more than one decoder circuit 62 detects such a subroutine call instruction concurrently, then address discrimination circuit 64 selects the instruction which is first in program order for conveyance upon DSP dispatch bus 56. It is noted that, in one embodiment, an instruction received by decoder circuit 62A is prior to an instruction concurrently received by decoder circuit 62B in program order. Similar relationships exist between other decoder circuits 62.

Decoder circuits 62 receive a DSP enable indication. If the DSP enable indication indicates that DSP 14 or 14A is enabled, then decoder circuits 62 detect subroutine call instructions and convey the target addresses to address discrimination circuit 64 (as described above). However, if the DSP enable indication indicates that DSP 14 or 14A is disabled, then decoder circuits 62 dispatch the subroutine call instructions upon dispatch buses 68, and no target addresses are conveyed to address discrimination circuit 64. The instructions are subsequently executed, causing a branch to a subroutine of x86 instructions implementing the DSP function. In this manner, the functionality performed by the DSP is performed by microprocessor 12. The DSP enable value may indicate disablement for microprocessor 12A if DSP 14 is not included in the computer system, for example. In one embodiment, a configuration register (not shown) within microprocessor 12 stores the DSP enable value. In an embodiment of microprocessor 12A, an external pin conveys the DSP enable value according to whether or not DSP 14 is included in the computer system.

Each of decoder circuits 62 is configured to convey an instruction upon one of dispatch buses 68, along with an indication of the unit or units to receive the instruction. In one embodiment, a bit is included within the indication for each of execute units 48 and load/store unit 50. If a particular bit is set, the corresponding unit is to execute the instruction. If a particular instruction is to be executed by more than one unit, more than one bit in the indication may be set.

Instruction alignment unit 60 is included to route instructions to decoder circuits 62. In one embodiment, instruction alignment unit 60 includes a byte queue in which instruction bytes fetched from instruction cache 42 are queued. Instruction alignment unit 60 locates valid instructions from within the byte queue and dispatches the instructions to respective decoder circuits 62. In another embodiment, instruction cache 42 includes predecode circuitry which predecodes instruction bytes as they are stored into instruction cache 42. Start and end byte information indicative of the beginning and end of instructions is generated and stored within instruction cache 42. The predecode data is transferred to instruction alignment unit 60 along with the instructions, and instruction alignment unit 60 transfers instructions to the decoder circuits 62 according to the predecode information. Instruction alignment unit 60 may be configured similar to the disclosure of the commonly assigned, co-pending patent application entitled: "A High Speed Instruction Alignment Unit for a Superscalar Microprocessor", Ser. No. 08/421, 669, now abandoned, filed Apr. 12, 1995 by Johnson, et al. The disclosure of this patent application is incorporated herein by reference in its entirety.

It is noted that address discrimination circuit 64 may be configured to convey a tag indicative of the selected DSP function upon DSP dispatch bus 56 instead of the target address. Address discrimination circuit 64 may store a mapping from target addresses to corresponding tags in order to select a particular tag.

Figure 5:
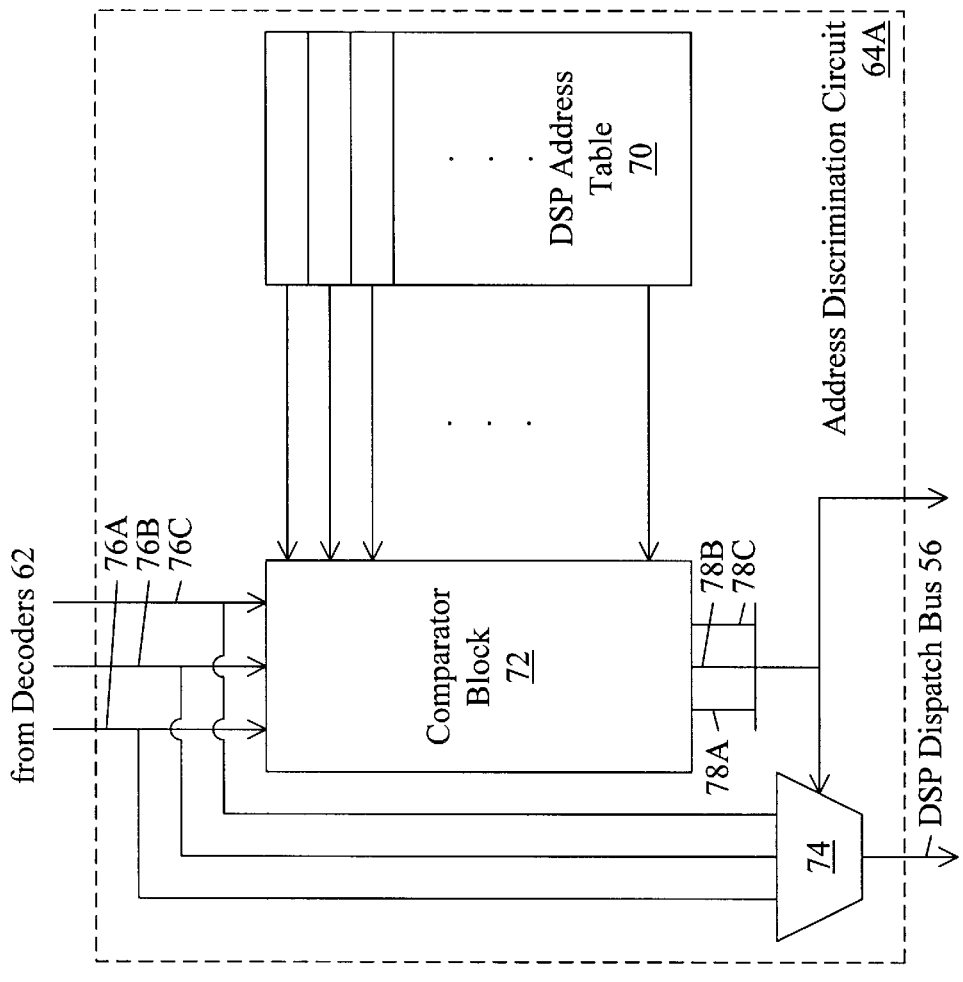
FIG. 5 is a diagram of one embodiment of the address discrimination circuit shown in FIG. 4.

Turning now to FIG. 5, a first embodiment of address discrimination circuit 64 (address discrimination circuit 64A) is shown. Address discrimination circuit 64A includes a DSP address table 70, a comparator block 72, and a multiplexor 74. DSP address table 70 is coupled to comparator block 72. Comparator block 72 is coupled to multiplexor 74. A plurality of target address buses 76A, 76B, and 76C are coupled between comparator block 72 and decoder circuits 62. Target address buses 76 are additionally coupled to multiplexor 74.

As noted above, when decoders 62 detect a subroutine call instruction, the target address is conveyed to address discrimination circuit 64. In the embodiment shown in FIG. 5, the target addresses are conveyed upon target address buses 76. One target address bus 76 is coupled to each decoder 62. The embodiment shown is employed with decoders 62 which include adder circuits for forming the target address. Another embodiment is contemplated in which address discrimination circuit 64A includes an adder circuit for each target address bus 76, and target address buses 76 convey a displacement and the address of the subroutine call instruction. The adder circuits add the displacement to the address to produce the target address.

DSP address table 70 stores addresses which define the start of DSP routines (i.e. routines performing DSP functions). In other words, the addresses stored in DSP address table 70 identify the first instruction in the particular routine. In one embodiment, the addresses may be stored into DSP address table 70 via special instructions which are defined to access and modify DSP address table 70. DSP address table 70 may comprise a plurality of registers. In another embodiment, the addresses may be permanently stored into a read-only memory (ROM) forming DSP address table 70. Each address stored in DSP table 70 is conveyed to one or more comparator circuits within comparator block 72. In one embodiment, DSP address table 70 comprises 16 storage locations for storing addresses.

Comparator block 72 comprises a comparator circuit for each address stored in DSP address table 70 and each target address bus 76. The comparator circuit compares the received target address and address from DSP address table 70. If the comparison indicates equality, then the comparator circuit asserts an output signal. If the comparison does not indicate equality, then the comparator circuit deasserts an output signal. The output signals from each comparator to which a particular target address bus 76 is coupled are logically combined to produce one of a plurality of hit signals upon conductors 78A, 78B, and 78C. A respective hit signal is asserted if any one of the comparator output signals which form the respective hit signal is asserted. Each hit signal is associated with a respect target address bus 76 (e.g. the hit signal upon conductor 78A is associated with target address bus 76A). A particular hit signal being asserted indicates that the corresponding target address is indicative of a DSP function.

Conductors 78 convey the hit signals to multiplexor 74. Multiplexor 74 is configured to select a target address to convey upon DSP bus 56 from the target addresses conveyed upon target address buses 76 according to the hit signals. If a particular hit signal is asserted, then the corresponding target address is selected by multiplexor 74. For the case of multiple hit signals being asserted, then multiplexor 74 applies a priority scheme to the hit signals. In one embodiment, the hit signal upon conductor 78A is given highest priority such that, if asserted, the target address conveyed upon target address bus 76A is selected. Similarly, if the hit signal upon conductor 78B is asserted and the hit signal upon conductor 78A is not asserted, then the target address conveyed upon target address bus 76B is selected by multiplexor 74. A target address for dispatch to the digital signal processor is thereby selected. It is noted that if no hit signal is asserted during a clock cycle, then an invalid value is conveyed upon DSP dispatch bus 56. Bus interface unit 40 and DSP unit 14A are configured to ignore the invalid value.

Conductors 78 are additionally returned to decoder circuits 62. If the hit signal associated with a particular decoder circuit 62 is asserted, then that decoder circuit 62 does not dispatch the subroutine call instruction to execute units 48. If the hit signal is not asserted, then the decoder circuit 62 dispatches the subroutine call instruction to execute units 48. If the decoder circuit 62 is not decoding a subroutine call instruction, then the decoder circuit 62 did not convey an address upon the corresponding target address bus, and therefore ignores the corresponding hit indication. It is noted that the number of target address buses 76 and conductors 78 is equal to the number of decoders 62 within instruction decode unit 46, according to one embodiment.

It is noted that DSP address table 70, in addition to storing target addresses defined to be indicative of a DSP function, may store a tag for each target address. The tag identifies the DSP function represented by the associated target address. Instead of conveying the target address upon DSP dispatch bus 56, the tag may be conveyed. DSP dispatch bus 56 is coupled to DSP address table 70 in such an embodiment, and the hit signals from comparator block 72 select the appropriate tag from those stored in DSP address table 70.

Figure 6:
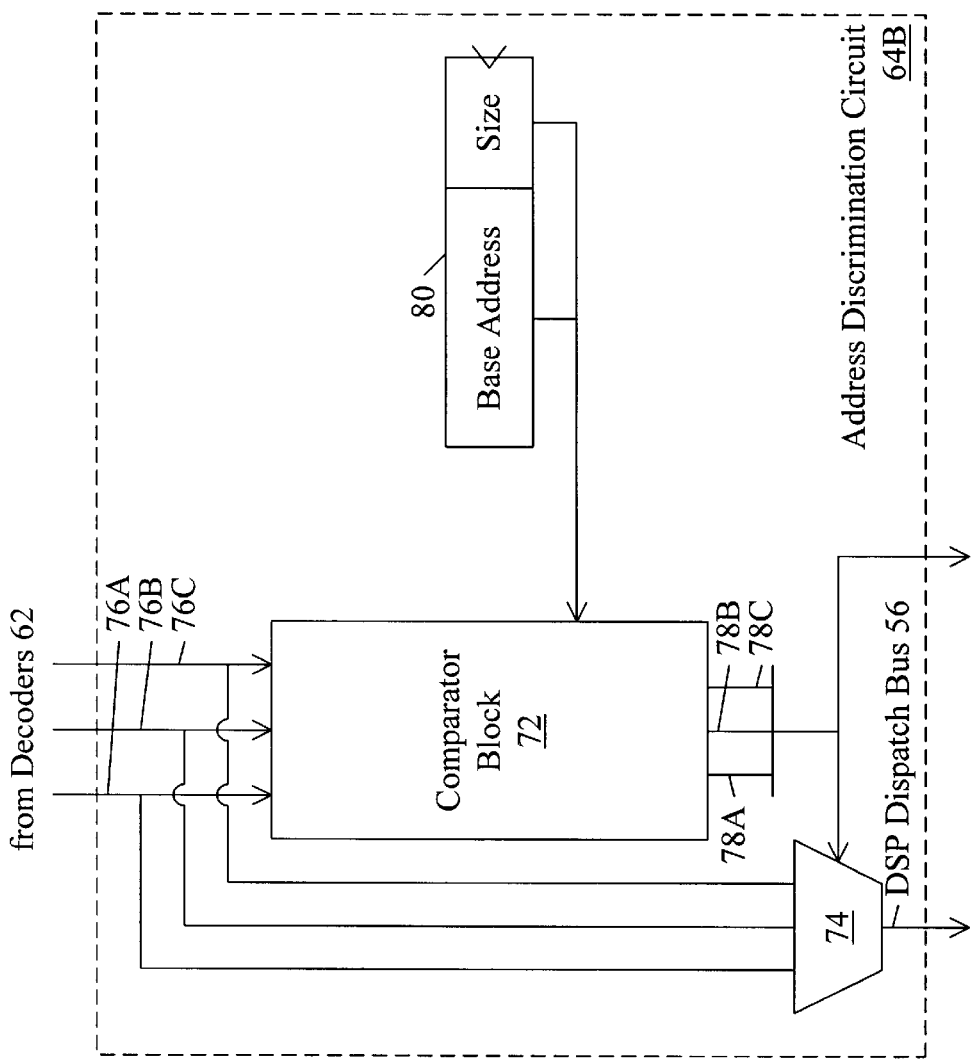
FIG. 6 is a diagram of another embodiment of the address discrimination circuit shown in FIG. 4.

Turning now to FIG. 6, a second embodiment of address discrimination circuit 64 (address discrimination circuit 64B) is shown. Address discrimination circuit 64B includes a comparator block 72 and a multiplexor 74, similar to like number elements in FIG. 5. However, addresses which are indicative of DSP functions are identified by a range of addresses specified by a DSP address register 80. DSP address register 80 stores a base address which defines the beginning of the range. DSP address register 80 further stores a size which, when added to the base address, defines the end of the range. An address within the range is determined to be indicative of a DSP function, and an address outside the range is not determined to be indicative of a DSP function. In one embodiment, the size is indicative of the number of bytes encompassed by the range.

In one embodiment, comparator block 72 includes a comparator circuit for comparing each target address conveyed upon target address buses 76 to the base address stored in DSP address register 80, and a comparator circuit for comparing each target address to the base address added to the size stored in DSP address register 80. If a target address compares greater than the base address and less than the base address added to the size, then the target address is indicative of a DSP function and the corresponding hit signal upon conductors 78 is asserted. In this embodiment, comparator block 72 includes an adder circuit for performing the addition of the base address and the size which are stored in DSP address register 80. In another embodiment, the size stored in DSP address register 80 selects the number of low order bits of the addresses which are ignored in the comparison. The remaining address bits are compared for equality in order to assert a corresponding hit signal.

As noted above, the hit signals cause multiplexor 74 to select a target address for conveyance upon DSP dispatch bus 56. Additionally, the hit signals are routed to decoder circuits 62 for determining if an associated subroutine call is dispatched to execute units 48. It is noted that the offset within the range of address define in this embodiment may be used to form the aforementioned tag.

Figure 7:
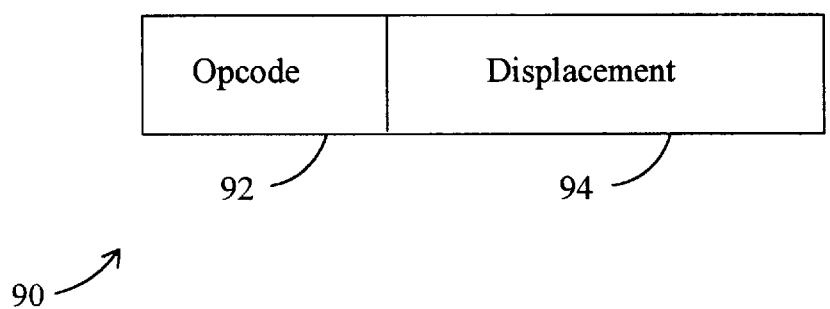
FIG. 7 is a diagram of a subroutine call instruction.

Turning now to FIG. 7, a diagram of an exemplary subroutine call instruction 90 is shown. Subroutine call instruction 90 includes an opcode field 92 and a displacement field 94. Opcode field 92 includes bits which define the subroutine call instruction within the instruction set employed by microprocessor 12. For example, if microprocessor 12 employs the x86 instruction set then opcode field 92 comprises up to two bytes which determine which x86 instruction is to be executed. Certain encodings of the bytes within opcode field 92 define subroutine call instructions, while other encodings define other instructions such as arithmetic instructions.

Displacement field 94 includes one or more bytes which are added to the address of the subroutine call instruction to generate the target address. In one embodiment, displacement field 94 comprises one, two, or four bytes in a given subroutine call instruction. As used herein, a byte comprises eight bits, wherein a bit is a binary digit capable of assuming a one or zero value.

In accordance with the above disclosure, a microprocessor has been described which detects subroutine calls to particular target addresses as indicative of a DSP function. The DSP function may be advantageously routed to a DSP unit or a DSP external to the microprocessor, allowing enhanced performance by performing DSP functions in a DSP instead of the microprocessor. If a DSP is not included within the computer system, then the microprocessor may be configured to execute the DSP function itself. Although less efficient then executing the function in a DSP, the program which calls the function advantageously executes properly.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to store instructions; and an instruction decode unit coupled to receive instructions from said instruction cache, wherein said instruction decode unit is configured to detect a subroutine call instruction having a target address, wherein said instruction decode unit comprises an address discrimination circuit configured to determine whether said target address is indicative of a digital signal processing function, and wherein said instruction decode unit is configured to route an indication of said target address to a digital signal processor and to dispatch said subroutine call instruction to an execute unit if said digital signal processor is not included.

2. The microprocessor as recited in claim 1 wherein said subroutine call instruction comprises a displacement field indicative of said target address.

3. The microprocessor as recited in claim 2 wherein said displacement field comprises at least one byte, and wherein said at least one byte is added to an address of a memory location storing said subroutine call instruction to form said target address.

4. The microprocessor as recited in claim 1 further comprising a digital signal processing unit coupled to receive said indication from said instruction decode unit, and wherein said digital signal processing unit comprises said digital signal processor.

5. The microprocessor as recited in claim 1 wherein said indication comprises said target address.

6. The microprocessor as recited in claim 1 wherein said indication comprises a tag corresponding to said target address.

7. The microprocessor as recited in claim 1 wherein said address discrimination circuit comprises:

a storage unit configured to store at least one address indicative of a DSP function; and a comparator block configured to compare said target address to said at least one address indicative of a DSP function, wherein said target address is routed to said digital signal processor if said comparator block determines that said target address is indicative of a DSP function.

8. The microprocessor as recited in claim 7 wherein said storage unit comprises a table of addresses.

9. The microprocessor as recited in claim 8 wherein said table of addresses is additionally configured to store a plurality of tags, wherein each one of said plurality of tags corresponds to a particular address within said table of addresses.

10. The microprocessor as recited in claim 7 wherein said storage unit comprises a register configured to store a base address and a size.

11. The microprocessor as recited in claim 10 wherein said base address and said size define a range of addresses which are indicative of a DSP function.

12. A computer system comprising:

a microprocessor configured to execute instructions including a subroutine call instruction having a target address and to determine whether said target address is a member of a group of addresses indicative of a digital signal processing function; and a digital signal processor coupled to receive an indication of said digital signal processing function from said microprocessor, wherein said digital signal processor is configured to perform said digital signal processing function according to said indication;

wherein said subroutine call instruction is dispatched to an execute unit if said digital signal processor is not included.

13. The computer system as recited in claim 12 wherein said subroutine call instruction comprises a displacement field indicative of a target address.

14. The computer system as recited in claim 13 wherein said displacement field comprises at least one byte, and wherein said at least one byte is added to an address of a memory location storing said subroutine call instruction to form said target address.

15. The computer system as recited in claim 13 wherein said indication of said digital signal processing function comprises said target address.

16. The computer system as recited in claim 13 wherein said indication of said digital signal processing function comprises a tag corresponding to said target address.

17. The computer system as recited in claim 12 wherein said digital signal processor is integrated within said microprocessor.

* * * * *